United States Patent
Treichler (12)

(10) Patent No.: US 6,724,395 B1
(45) Date of Patent: Apr. 20, 2004

(54) SYSTEM, METHOD AND ARTICLE OF MANUFACTURE FOR ANISOTROPIC TEXTURE SAMPLING

(75) Inventor: Sean J. Treichler, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 09/534,886

(22) Filed: Mar. 24, 2000

(51) Int. Cl.$^7$ .................. G09G 5/00; G06T 17/00
(52) U.S. Cl. ............................ 345/582; 345/428
(58) Field of Search .................. 345/582, 428

(56) References Cited

U.S. PATENT DOCUMENTS

| | | | | |
|---|---|---|---|---|
| 4,855,934 A | * | 8/1989 | Robinson | 345/419 |
| 5,651,104 A | * | 7/1997 | Cosman | 345/428 |
| 6,078,335 A | * | 6/2000 | Wong et al. | 345/582 |
| 6,097,397 A | * | 8/2000 | Lee | 345/586 |
| 6,292,193 B1 | * | 9/2001 | Perry et al. | 345/428 |

OTHER PUBLICATIONS

"Texram: A Smart Memory for Texturing", Schilling et al., IEEE Computer Graphics and Applications, pp. 32–41, 1966.*

Lance Williams; "Pyramidal Parametrics"; Jul. 1983; Computer Graphics, vol. 17. No. 3 Computer Graphics Laboratory, New York Institute of Technology, Old Westbury, N.Y.; pp. 1–11.

James F. Blinn et al., "Texture and Reflection in Computer Generated Images"; Oct. 1976; Graphics and Image Processing; Association for Computing Machinery, Inc. pp. 542–547.

Ned Greene, New York Institute of Technology; "Environment Mapping and Other Applications of World Projections"; Nov. 1986; The Institute of Electrical and Electronics Engineers Inc. Computer Society; pp. 21–29.

\* cited by examiner

*Primary Examiner*—Jeffery Brier
*Assistant Examiner*—Ryan Yang
(74) *Attorney, Agent, or Firm*—Silicon Valley IP Group, LLC; Kevin J. Zilka

(57) ABSTRACT

A system, method and article of manufacture are provided for anisotropic filtering during texture sampling. A description of a region, e.g. pixel footprint in a source image, to be texture sampled is initially received. Thereafter, the region is subdivided based on the description into a plurality of samples with a predetermined shape for mapping textures onto the samples. By subdividing the region in the source image into a plurality of samples having a predetermined shape, the region may be covered by samples that may be configured to be more suitable for an underlying process such as MIP mapping, thus allowing efficient texture sampling while reducing blurring, aliasing and other visual artifacts.

26 Claims, 7 Drawing Sheets

SYSTEM, METHOD AND ARTICLE OF MANUFACTURE FOR ANISOTROPIC TEXTURE SAMPLING

FIELD OF THE INVENTION

The present invention relates to computer graphics, and more particularly to anisotropic texture sampling in a computer graphics processing pipeline.

BACKGROUND OF THE INVENTION

In the field of computer graphics, texture mapping refers to a process for mapping an image onto a surface of a graphical object to enhance the visual realism of a generated image. Intricate detail at the surface of an object is very difficult to model using polygons or other geometric primitives, and doing so can greatly increase the computational cost of the object. Texture mapping is a more efficient way to represent fine detail on the surface of an object. A "texture map" is a digital image, which is also referred to as the "source image." The texture map is typically rectangular in shape and has its own (u, v) coordinate space. Individual elements of the texture map are referred to as "texels." In a texture mapping operation, a texture or "source image" is mapped to the surface of a graphical model as the model is rendered to create a target image.

As digital images, the source and the target images are sampled at discrete points, usually on a grid of points with integer coordinates. In the source image, texels are usually located at integer coordinates in the (u, v) coordinate system. Similarly, in the target image, pixels are usually located at integer coordinates in the (x, y) coordinate system.

The process of texture mapping generally includes sampling data from the source image to compute an intensity value for a pixel in the destination image. The texels to be sampled for a given pixel are typically identified by mapping a region in the destination image into the source image. Texels neighboring the mapped point in the source image are then sampled, weighted and summed to compute the intensity value for a pixel. This process is then repeated for additional pixels in the destination image.

While texture mapping is an effective technique for generating images with surface detail, present approaches often produce unacceptable amounts of distortion. Distortion results because, in practice, several approximations are made in computing pixel intensities. In real time graphics systems, the problem is particularly acute because each pixel value must be computed quickly so that the entire image can be generated within a fixed time period. Because of these rigorous timing constraints, real time systems either do not support texture mapping or make additional approximations that reduce image quality.

To simplify texture mapping operations, some systems make approximations in determining the shape of a sampling region in the source image. The sampling region is the area in the source image that defines which texels to sample in computing a pixel intensity, and is sometimes referred to as the pixel footprint in the source image. The footprint can have a different shape for each target pixel. It is often difficult to find the exact shape of the footprint and the weighting factors to apply to the texels inside the footprint. Some systems make the approximation of using the same shape for the filter at every point, although they may allow the size of the filter to vary. This approach often leads to artifacts in the final image that degrade image quality.

Filters that approximate footprints with squares or circles of variable size are referred to as isotropic filters. A circle is truly isotropic since it has the same length in all directions. When used with a rectangular array of texels, a square is essentially isotropic, since it has equal dimensions horizontally and vertically.

Isotropic filtering can produce distortion because the same filter shape is used regardless of the extent to which the mapping is non-uniform from destination to source image. In areas of the source image where the actual footprint is highly elongated, an essentially isotropic shape such as a square or a circle is a poor substitute for the footprint, even if the size is adjustable. Since an isotropic filter only has one shape, it can not accurately capture texels in an elongated footprint. For example, a square filter cannot accurately sample texel values from a quadrilateral footprint elongated in one direction. Sampling texels outside the actual footprint can cause blurring. Not sampling texels in the footprint, on the other hand, can cause the final image to sparkle due to aliasing. One example of filtering, multum in parvo (MIP) mapping, also suffers from this disadvantage.

During MIP mapping, a number of texture maps are stored at different resolutions. For example, if the one texture is at 512×512 texels, textures at 256×256, 128×128, 64×64, etc. can also be stored. This "pyramid" of texture maps at varying resolution can be used to find the best fit for an isotropic filter on the footprint of the pixel mapped into the texture. The process begins by finding the two textures where the footprint is closest in size to the size of the filter. It then performs interpolation for the two textures that fit the footprint most closely to compute two intermediate values. Finally, it interpolates between the two intermediate values to find a value for the pixel.

MIP mapping is suited for handling only square pixels that are oriented in a predetermined manner in texture space. As such, when a projection of a pixel in texture space varies in shape and size, this texture mapping process is subject to aliasing and blurring.

There is thus a need for a way of benefiting from the process simplification afforded by isotropic filtering while reducing the complications of blurring and aliasing during texture mapping processes such as MIP mapping.

DISCLOSURE OF THE INVENTION

A system, method and article of manufacture are provided for anisotropic filtering during texture sampling. A description of a region, e.g. pixel footprint in a source image, to be texture sampled is initially received. Thereafter, the region is subdivided based on the description into a plurality of samples with a predetermined shape for mapping textures onto the samples. By subdividing the region in the source image into a plurality of samples having a predetermined shape, the region may be covered by samples that may be configured to be more suitable for MIP mapping, thus allowing efficient texture sampling while reducing blurring, aliasing and other visual artifacts.

In one embodiment of the present invention, the predetermined shape of the samples may have a substantially square configuration, and the region may have a substantially rectangular configuration. It should be noted that the rectangular region may be arbitrarily oriented. As an option, it may be determined whether the region has a rectangular configuration. If the region does not have a rectangular configuration, a rectangular shape corresponding to the region may be approximated.

In another embodiment of the present invention, the subdivision of the region may include calculating a length and an area of the region such that the subdivision may be determined based on the calculated length and area. In particular, the subdivision may be determined based on an aspect ratio (r) which equals length (L) squared divided by area (A).

If the aspect ratio (r) is greater than a predetermined value, the rectangle may be augmented, thus adjusting the aspect ratio (r) to a desired value. Further, a level of detail (LOD) value associated with the region may be calculated. If the LOD value is less than a predetermined value such as zero (0), the present invention may be capable of refraining from subdividing the region into samples.

In still another embodiment of the present invention, a test may be performed in order to determine the manner in which the region is to be subdivided based on the aspect ratio (r). Specifically, it may be determined if $\log_2(r)>LOD$. In operation, the subdivision of the samples may be determined using the expression $\frac{1}{2}-1/(2*r)$ if it is determined that $\log_2(r)$ is less than or equal to LOD. If, on the other hand, it is determined that $\log_2(r)>LOD$, the subdivision of the samples may be determined using the expression $\frac{1}{2}-1/(2*2^{LOD})$. It should be noted that such expressions relate to the spacing of centers of the samples with respect to the center of the region in the source image.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1A:
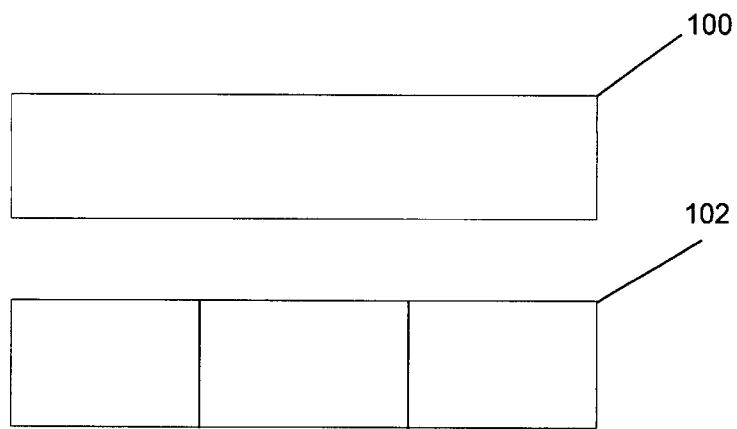
FIGS. 1A and 1B illustrate the subdivision of a pixel footprint into a plurality of samples during the anisotropic filtering process of the present invention.
Figure 1B:
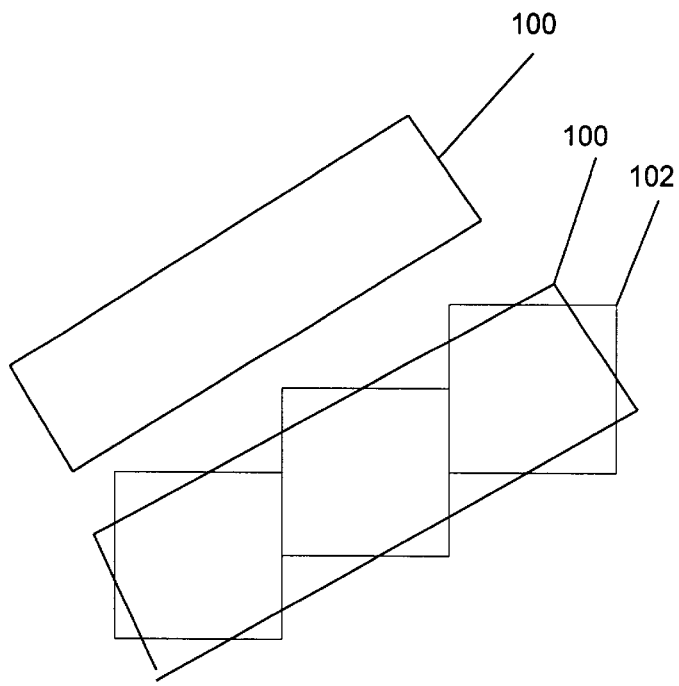

FIGS. 1A and 1B illustrate the subdivision of a region into a plurality of samples during the anisotropic filtering process of the present invention. As shown, a region 100 with a substantially rectangular configuration is subdivided into a plurality of samples 102 of a predetermined shape. In operation, textures are then mapped onto the samples using various filtering techniques, e.g. MIP mapping, etc. It should be noted that the region may include, but is not limited to a pixel footprint.

Figure 2:
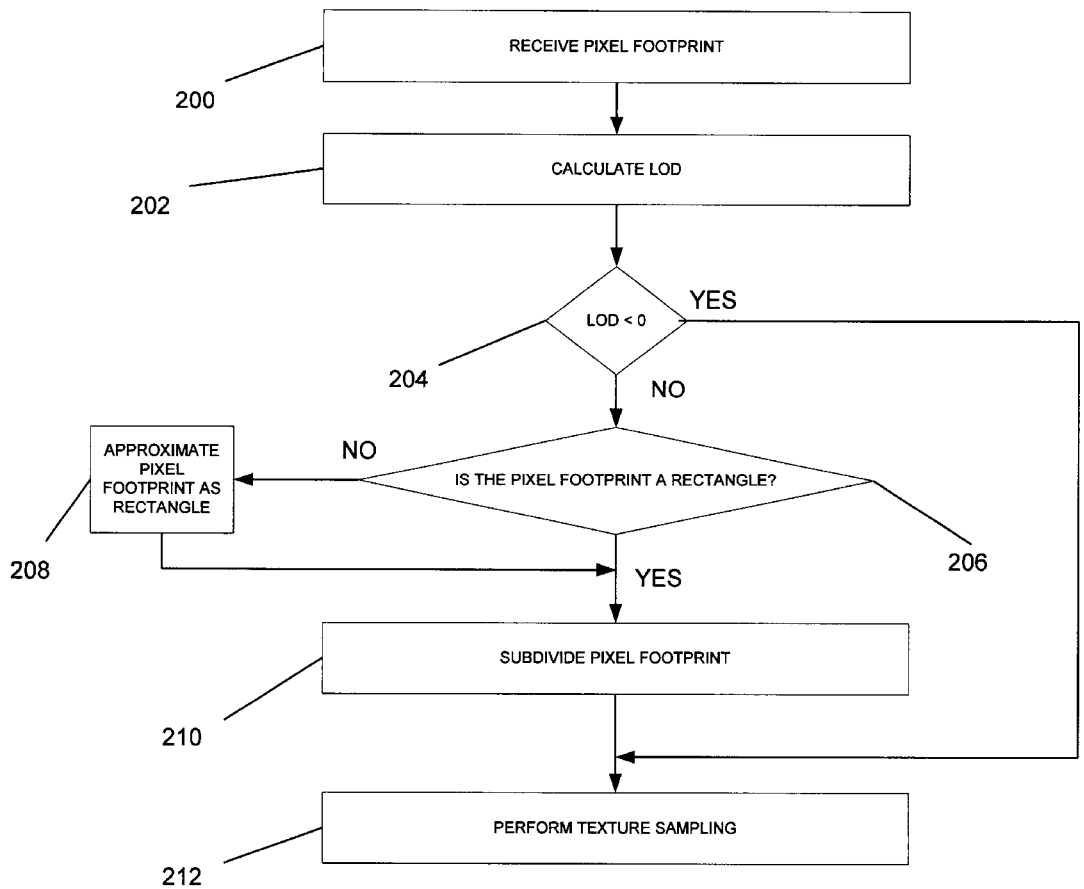
FIG. 2 is a flowchart setting forth the process by which the pixel footprint is subdivided as shown in FIGS. 1A and 1B.
Figure 2A:
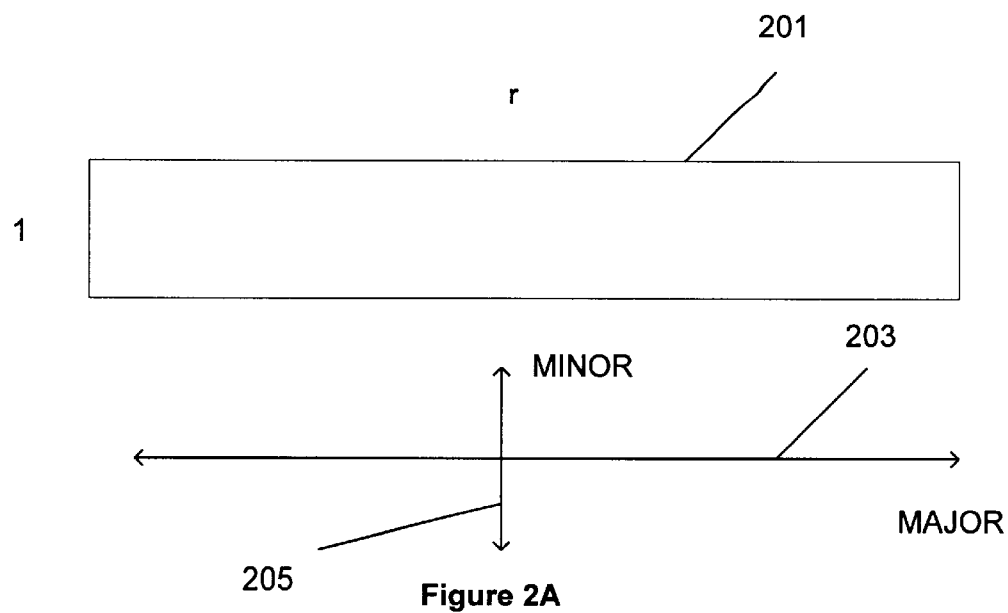
FIG. 2A illustrates an exemplary pixel footprint which has a length designated as a "major axis" and a height designated as a "minor axis" in accordance with one embodiment of the present invention.

FIG. 2 is a flowchart setting forth the process by which the pixel footprint is subdivided as shown in FIG. 1. In operation 200, a pixel footprint is received which is to be texture mapped. FIG. 2A illustrates an exemplary pixel footprint 201 which has a length 203 designated as a "major axis" and a height 205 designated as a "minor axis."

Thereafter, a level of detail (LOD) is calculated in operation 202. The LOD may be calculated in any desired manner. For example, the LOD may be calculated in the manner set forth in a co-pending application entitled "SYSTEM, METHOD AND ARTICLE OF MANUFACTURE FOR CALCULATING A LEVEL OF DETAIL (LOD) DURING COMPUTER GRAPHICS PROCESSING" filed Mar. 24, 2000 under Ser. No. 09/535,045 naming Walt Donovan and John Montrym as inventors which is incorporated herein by reference in its entirety.

In particular, four texture coordinates ($u_0$, $u_1$, $U_2$, $U_3$) may be first identified on the texture map corresponding to the four portions of a block of pixel footprints. Such texture coordinates may be such that $u_0$ refers to an upper left corner of the block, $u_1$ refers to an upper right corner of the block, $u_2$ refers to a lower left corner of the block, and $U_3$ refers to a lower right corner of the block. In one embodiment, the block may be a 2×2 block of pixel footprints.

Figure 2B:
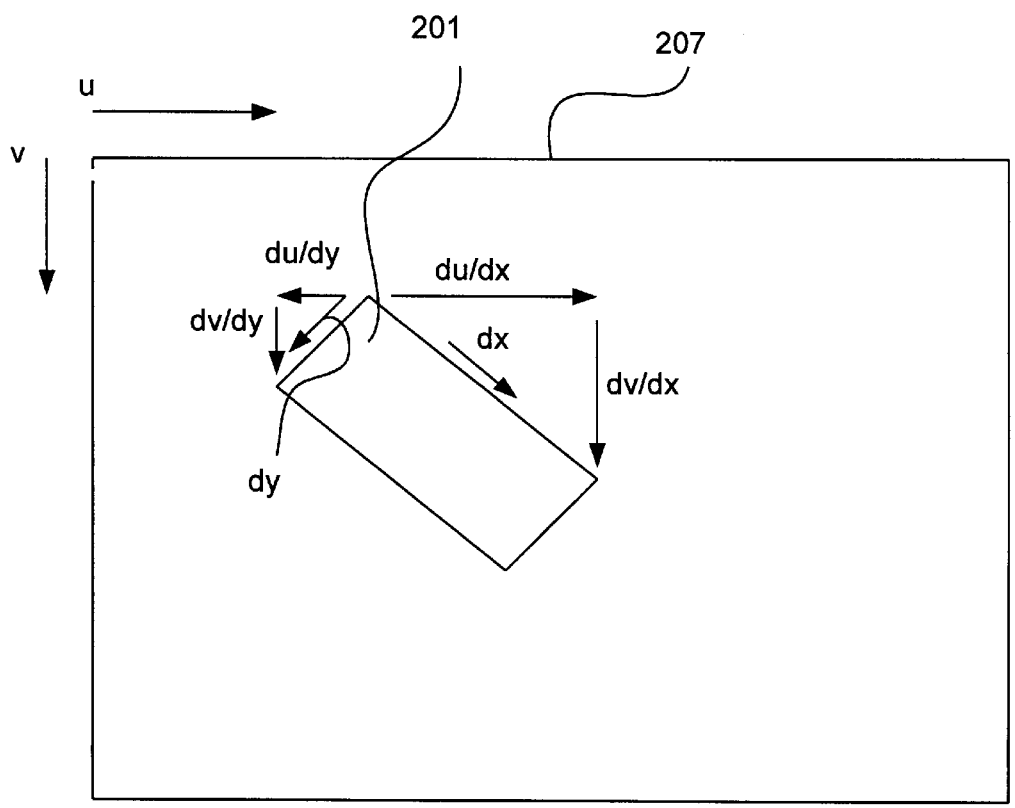
FIG. 2B graphically illustrates the derivatives values ($u_x$) and ($u_y$) of a texture map in accordance with one embodiment of the present invention.

Thereafter, derivative values ($u_x$), or du/dx, and ($u_y$), or du/dy, are calculated. FIG. 2B graphically illustrates the derivatives values ($u_x$) and ($u_y$). The pixel footprint 201 is mapped in a texture coordinate space 207 with the derivatives values ($u_x$) and ($u_y$) defined as shown.

While the derivative values may be calculated in any known manner, the derivative values ($u_x$) and ($u_y$) may be estimated using Equations #1.

$$u_x=((u_1-u_0)+(u_3-u_2))/2$$

$$u_y=((u_2-u_0)+(u_3-u_1))/2 \quad \text{Equations \#1}$$

It should be noted that similar calculations may be performed for $v_{x,y}$ and $p_{x,y}$ texture coordinates using the corresponding equations for derivatives with respect to the x and y axis. With such information, a LOD value is calculated using Equation #2.

$$LOD=\log_2 \max\;[(u_x^2+v_x^2+p_x^2)^{1/2},\;(u_y^2+u_y^2+p_y^2)^{1/2}] \quad \text{Equation \#2}$$

In decision 204, it is determined whether the calculated LOD<0. If so, the sample subdivision of the pixel footprint in steps 206–210 is skipped. The reasons for such will be set forth in greater detail during reference to FIG. 4. It should be noted that, as an option, the anisotropic filtering may be skipped if LOD is less than any predetermined number which is governed by an underlying process. In the present embodiment, the underlying process is MIP mapping, and the predetermined number is 0.

Figure 2C:
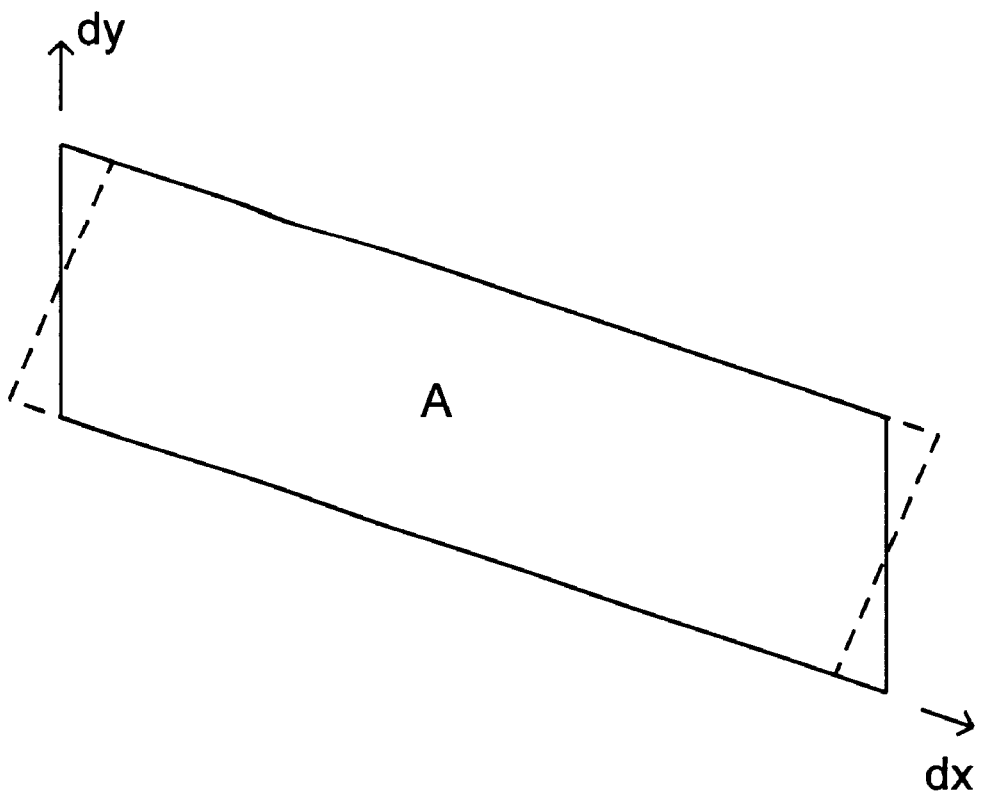
FIG. 2C illustrates the manner in which the rectangular shape of a pixel footprint may be approximated in accordance with one embodiment of the present invention.

With continuing reference to FIG. 2, it is determined in decision 206 whether the pixel footprint is a rectangle. If it is determined that the pixel footprint does not have a rectangular configuration in decision 206, a rectangular shape corresponding to the pixel footprint may be approximated while preserving the area and the major axis length. FIG. 2C illustrates the manner in which the rectangular shape of a pixel footprint may be approximated. As shown, upon the receipt of a skewed rectangular pixel footprint, the rectangle may be approximated by shearing or the like in the manner shown so as to reflect a true rectangle for reasons that will soon become apparent. Note operation 208. It should be noted that the pixel footprint may take on any quadrilateral shape based on the perspective texture mapping that is being employed.

Next, in operation 210, the pixel footprint is subdivided in a consistent manner. In one embodiment, any number of samples may be defined. In the example described in detail herein, the number of samples is two (2). Thus, hardware may be specifically configured to handle 2 samples per pixel footprint. In one embodiment of the present invention, the predetermined shape of the samples may have a substantially square configuration. This way, texture sampling may be performed in operation 212 using a standard MIP mapping procedure or the like. It should be understood, however, that any type of texture sampling may be used per the desires of the user.

Figure 3:
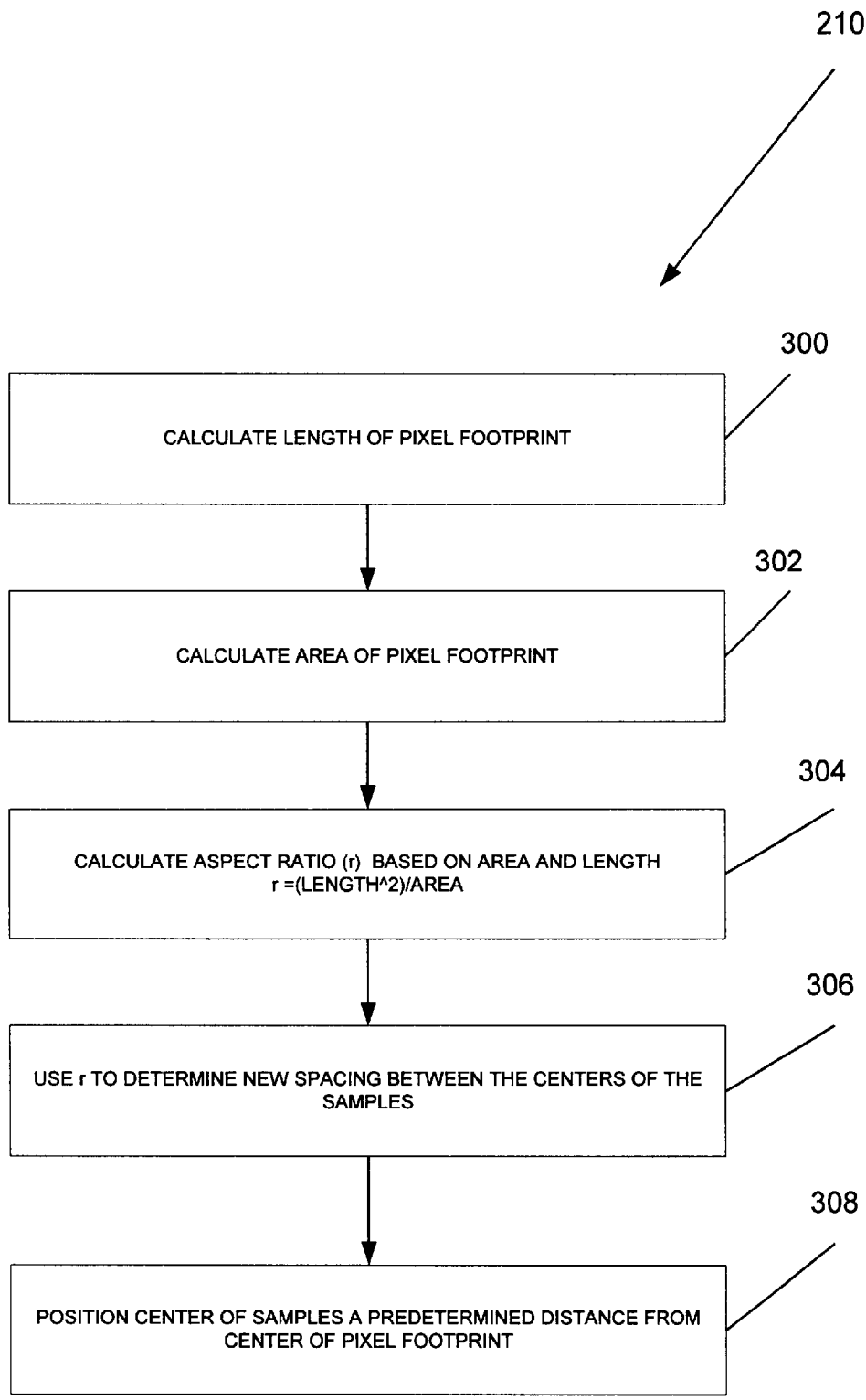
FIG. 3 is a flow diagram illustrating the various operations associated with subdividing the pixel footprint in operation 210 of FIG. 2.

FIG. 3 is a flow diagram illustrating the various operations associated with subdividing the pixel footprint in operation 210 of FIG. 2. As shown, a length of the pixel footprint is first calculated in operation 300. In one embodiment, the length may be determined by first identifying whether the major axis of the pixel footprint corresponds to dx or dy. Next, derivative values $u_x$, $v_x$ or $u_y$, $v_y$ (as defined hereinabove during reference to FIG. 2B) are used with Equations #3 to calculate a squared length (L) of the pixel footprint, $L^2$. It should be noted that derivative estimations similar to those used during the LOD calculation (See Equations #1) may be used for the $L^2$ calculation.

$$L^2 = |du|^2 + |dv|^2, \text{ where} \qquad \text{Equations \#3}$$

$du = u_x$ and $dv = v_x$ if the major axis corresponds to dx
$du = u_y$ and $dv = v_y$ if the major axis corresponds to dy In operation 302, an area (A) of the pixel footprint is calculated using Equation #4.

$$A = |dx \times dy|, \text{ where} \qquad \text{Equation \#4}$$

dx and dy are vectors in the coordinate space of the source image
$dx = (u_x, v_x)$
$dy = (u_y, v_y)$ With continuing reference to FIG. 3, an aspect ratio (r) of major axis length to minor axis length may be calculated in operation 304 using Equation #5. As will soon become apparent, r may be used to determine spacing among the samples when the pixel footprint is subdivided. Note operation 306. In operation 308, the center of the samples are positioned a predetermined distance from a center of the pixel footprint.

$$r = L^2 / A \qquad \text{Equation \#5}$$

Figure 4:
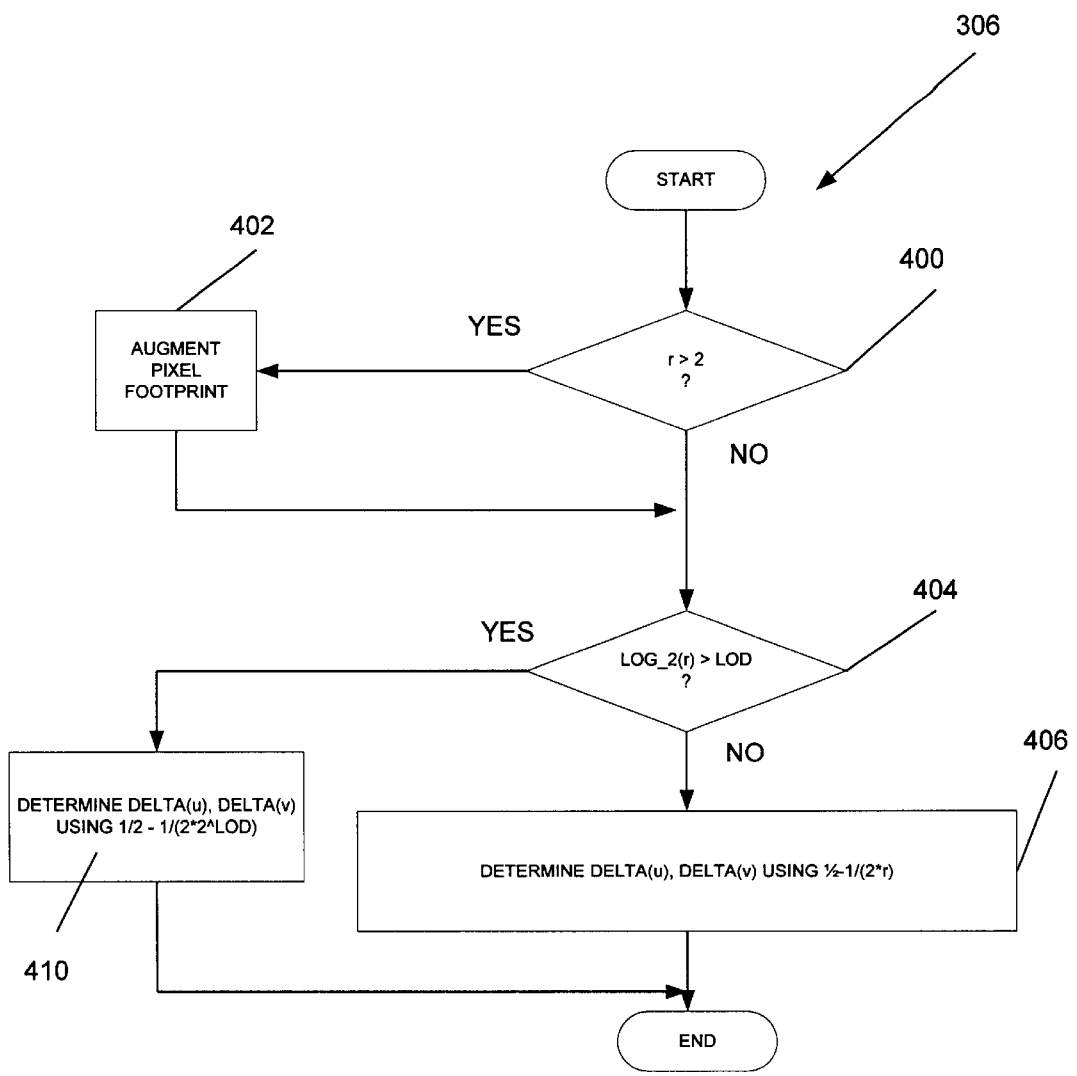
FIG. 4 is a flow diagram illustrating the manner in which the aspect ratio is used to determine the spacing of the samples in operation 306 of FIG. 3.

FIG. 4 is a flow diagram illustrating the manner in which the aspect ratio is used to determine the spacing of the samples of the pixel footprint in operation 306 of FIG. 3. As indicated earlier, the present invention is adapted to accommodate hardware equipped to handle two samples per pixel footprint. As such, if it is determined in decision 400 that the aspect ratio (r) is greater than 2, the rectangle may be augmented by adjusting the minor axis length to make r=2. Note operation 402. It should be noted that r is never less than 1 since in calculating the length in operation 300 of FIG. 3, the longer axis was selected.

Next, in decision 404, a query is made to determine if LOD'<0. Equation #6 defines LOD'.

$$LOD' = LOD - \log_2(r) \qquad \text{Equation \#6}$$

Special measures may be executed if LOD'<0 in order to deal with the limitations of the underlying filtering process. For example, in decision 204 of FIG. 2, it was decided whether LOD<0 since such would indicate that LOD'<0 (the $\log_2(r)$ term of Equation #6 is always positive), and the anisotropic texture filtering of the present invention may be skipped. It may also be that LOD is greater than or equal to 0, but LOD'<0. For this reason, it is determined in decision 404 whether $\log_2(r)$>LOD. If not, normal procedures may be carried out in operation 406.

Figure 4A:
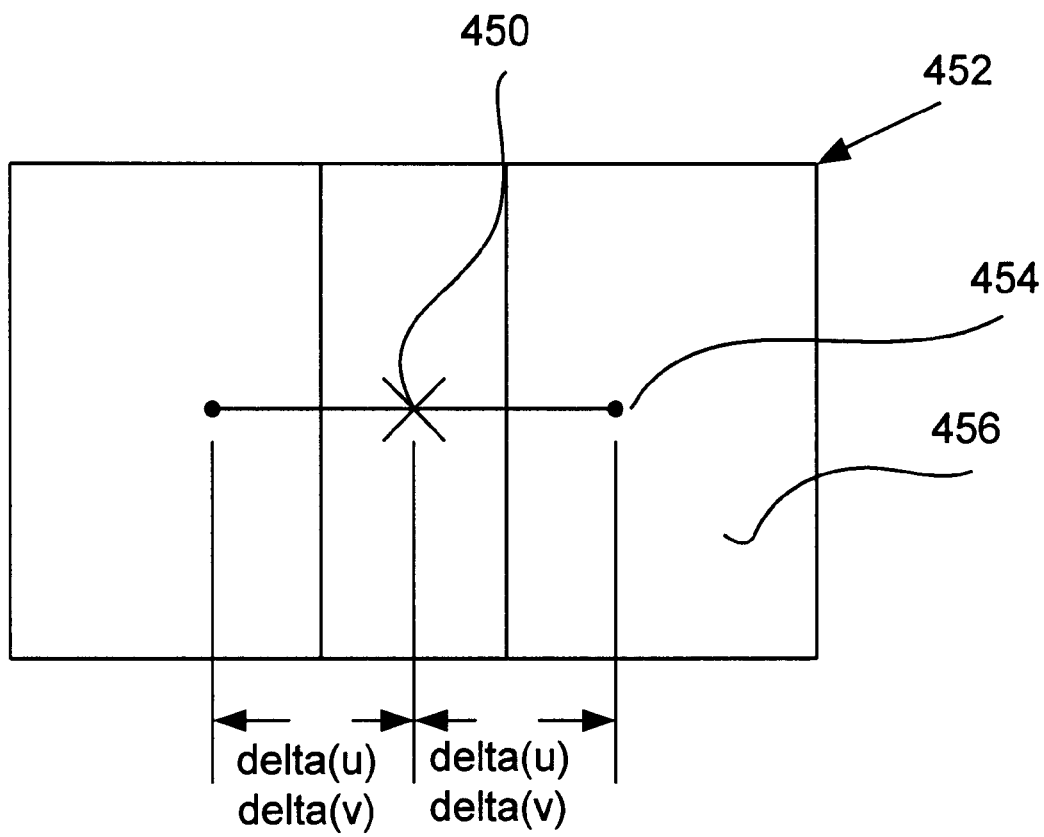
FIG. 4A illustrates the subdivision of a pixel footprint with an aspect ratio that is less than or equal to 2 in accordance with one embodiment of the present invention.

In operation 406, a distance is calculated from a center of the pixel footprint to points which constitute centers of the samples. This information facilitates proper positioning of the samples such that any overlapping of the samples occurs at a center of the pixel footprint where blurring will be least prevalent. As shown in FIG. 4A, u and v define a distance from the center 450 of the pixel footprint 452 to a point 454 which constitutes a center of the samples 456. Note operation 408. Equations #7 may be used to calculate u and v.

$$u = [\tfrac{1}{2} - 1/(2*r)] \cdot du$$
$$v = [\tfrac{1}{2} - 1/(2*r)] \cdot dv, \text{ where} \qquad \text{Equations \#7}$$

du and dv correspond to the major axis

If, on the other hand, it is determined that $\log_2(r)$>LOD, the subdivision of the samples may be determined using Equations #8. Note operation 410.

$$u = [\tfrac{1}{2} - 1/(2*2^{LOD})] \cdot du$$
$$v = [\tfrac{1}{2} - 1/(2*2^{LOD})] \cdot dv, \text{ where} \qquad \text{Equations \#8}$$

du and dv correspond to the major axis

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for anisotropic filtering during texture sampling, comprising:
   receiving a description of a region to be texture sampled; and
   subdividing the region based on the description into a plurality of samples with a predetermined shape for mapping textures onto the samples;
   wherein subdividing the region includes calculating a length of the region, and calculating an area of the region, wherein the subdivision is determined based on the calculated length and area;
   wherein the subdivision is determined based on an aspect ratio (r) which equals the length squared divided by the area.

2. The method as recited in claim 1, wherein the region is a pixel footprint.

3. The method as recited in claim 1, wherein the predetermined shape of the samples has a substantially square configuration.

4. The method as recited in claim 1, wherein the region has a substantially rectangular configuration.

5. A method for anisotropic filtering during texture sampling, comprising:
   receiving a description of a region to be texture sampled;
   determining whether the region has a rectangular configuration;

approximating a rectangular shape corresponding to the region if the region does not have a rectangular configuration; and subdividing the region based on the description into a plurality of samples with a predetermined shape for mapping textures onto the samples.

6. The method as recited in claim 1, and further comprising augmenting the rectangle if the aspect ratio (r) is greater than a predetermined value.

7. The method as recited in claim 1, and further comprising calculating a level of detail (LOD) value associated with the region.

8. The method as recited in claim 7, and further comprising refraining from subdividing the region into samples if the LOD value is less than a predetermined value.

9. The method as recited in claim 8, wherein the predetermined value equals zero (0).

10. The method as recited in claim 7, and further comprising determining if $\log_2(r)>LOD$.

11. The method as recited in claim 10, wherein the subdivision of the samples is determined using the expression $\frac{1}{2}-1/(2*r)$ if it is determined that $\log_2(r)$ is less than or equal to LOD.

12. The method as recited in claim 10, wherein the subdivision of the samples is determined using the expression $\frac{1}{2}-1/(2*2^{LOD})$ if it is determined that $\log_2(r)>LOD$.

13. The method as recited in claim 5, wherein the mapping includes MIP mapping.

14. A computer program embodied on a computer readable medium for anisotropic filtering during texture sampling, comprising:

a code segment for receiving a description of a region to be texture sampled;

a code segment for determining whether the region has a rectangular configuration;

a code segment for approximating a rectangular shape corresponding to the region if the region does not have a rectangular configuration; and a code segment for subdividing the region based on the description into a plurality of samples with a predetermined shape for mapping textures onto the samples.

15. A computer program embodied on a computer readable medium for anisotropic filtering during texture sampling, comprising:

a code segment for receiving a description of a region to be texture sampled; and a code segment for subdividing the region based on the description into a plurality of samples with a predetermined shape for mapping textures onto the samples;

wherein the code segment for subdividing the region includes a code segment for calculating a length of the region, and a code segment for calculating an area of the region, wherein the subdivision is determined based on the calculated length and area;

wherein the subdivision is determined based on an aspect ratio (r) which equals the length squared divided by the area.

16. The computer program as recited in claim 15, wherein the region is a pixel footprint.

17. The computer program as recited in claim 15, wherein the predetermined shape of the samples has a substantially square configuration.

18. The computer program as recited in claim 15, wherein the region has a substantially rectangular configuration.

19. The computer program as recited in claim 15, and further comprising a code segment for augmenting the rectangle if the aspect ratio (r) is greater than a predetermined value.

20. The computer program as recited in claim 15, and further comprising a code segment for calculating a level of detail (LOD) value associated with the region.

21. The computer program as recited in claim 20, and further comprising a code segment for refraining from subdividing the region into samples if the LOD value is less than a predetermined value.

22. The computer program as recited in claim 21, wherein the predetermined value equals zero (0).

23. The computer program as recited in claim 20, and further comprising a code segment for determining if $\log_2(r)>LOD$.

24. The computer program as recited in claim 23, wherein the subdivision of the samples is determined using the expression $\frac{1}{2}-1/(2*r)$ if it is determined that $\log_2(r)$ is less than or equal to LOD.

25. The computer program as recited in claim 23, wherein the subdivision of the samples is determined using the expression $\frac{1}{2}-1/(2*2^{LOD})$ if it is determined that $\log_2(r)>LOD$.

26. The computer program as recited in claim 14, wherein the mapping includes MIP mapping.

* * * * *